United States Patent [19]

Bhattacharya et al.

[11] Patent Number: 5,304,610

[45] Date of Patent: * Apr. 19, 1994

[54] AMPHOTERIC COPOLYMER DERIVED FROM VINYLPYRIDINE AND ACETOXYSTYRENE

[75] Inventors: Apurba Bhattacharya; Kenneth G. Davenport; Michael T. Sheehan; James R. Sounik, all of Corpus Christi, Tex.

[73] Assignee: Hoechst Celanese Corporation, Summerville, N.J.

[*] Notice: The portion of the term of this patent subsequent to May 11, 2010 has been disclaimed.

[21] Appl. No.: 42,358

[22] Filed: Apr. 2, 1993

Related U.S. Application Data

[62] Division of Ser. No. 3,350, Jan. 12, 1993.

[51] Int. Cl.$^5$ .............................................. C08F 26/06
[52] U.S. Cl. .................................... 525/327.1; 526/265
[58] Field of Search ...................... 525/327.1; 526/265

[56] References Cited

U.S. PATENT DOCUMENTS

| | | | |
|---|---|---|---|
| 2,611,763 | 9/1952 | Jones | 526/265 |
| 2,732,351 | 1/1956 | Clarke | 526/265 |
| 3,553,180 | 1/1971 | Cleary | 526/265 |
| 4,593,082 | 6/1986 | Dombroski et al. | 526/265 |
| 4,775,730 | 10/1988 | Gupta | 526/326 |
| 4,902,780 | 2/1990 | Bourrain et al. | 526/265 |

*Primary Examiner*—Joseph L. Schofer
*Assistant Examiner*—N. Sarofim
*Attorney, Agent, or Firm*—James J. Mullen; Donald R. Cassady

[57] ABSTRACT

A unique polymer was synthesized via copolymerization of vinylpyridine and acetoxystyrene under radical-initiated conditions followed by acidic or basic hydrolysis of the acetoxy group to afford the corresponding hydroxy group. The built-in acid-base dual functionality (phenolic and pyridyl units) in this polymer backbone gives rise to its unique solubility properties over a wide pH range in both aqueous and non-aqueous media. Due to its amphoteric nature, this polymer finds application as an anti-stat, viscosity modifier, and/or ion-exchange resin.

1 Claim, No Drawings

AMPHOTERIC COPOLYMER DERIVED FROM VINYLPYRIDINE AND ACETOXYSTYRENE

This application is a divisional of pending patent application Ser. No. 08/003,350 filed Jan. 12, 1993.

BACKGROUND OF THE INVENTION

This invention relates to a new copolymer derived from acetoxystyrene and vinylpyridine.

Various copolymers of p-acetoxystyrene and other polymerizable monomers are known in the art and have miscellaneous end uses. For example, Japanese Kokai Nos. 77 35779, published Mar. 18, 1977, and 77 58087, published May 13, 1977, disclose copolymers of p-acetoxystyrene and divinylbenzene which are hydrolyzed, treated with paraformaldehyde and dimethyl amine or pyrolidine, and quaternized with methyl bromide or dimethyl sulfate to obtain anion exchange resins. Japanese Kokai No. 77 35189, published Mar. 17, 1977, teaches the sulfonation of copolymers of p-acetoxystyrene and a polyene compound such as divinylbenzene to obtain microporous cation exchange resins. Arshady et al., "Phenolic Resins for Solid-Phase Peptide Synthesis: Copolymerization of Styrene and p-Acetoxystyrene", J. Polymer Science: Polymer Chemistry Edition, Vol. 12, 2017-2025 (1974), show copolymers of styrene, p-acetoxystyrene, and divinyl benzene used to produce cross-linked resins for solid phase peptide synthesis.

In addition to the foregoing, the prior art also shows different polymers of p-vinylphenol for various applications. Thus, Japanese Patent Publication No. 34902/1978 teaches compositions comprising a polymer having more than 20 mole percent of p-hydroxystyrene (i.e., p-vinylphenol) and an aromatic azide compound, which are useful for photoresist, relief printing plate, and offset printing plate applications. German Offenlegungschrift DE No. 3,311,129, published Apr. 7, 1982, shows corrosion-resistant waterborne coatings useful on phosphated metals based on solutions of aminomethylated poly(4-vinylphenols) prepared by reacting poly(4-vinylphenol) with formaldehyde and methylhydroxyethyl amine. Furuya (Res. Inst. Polym. Text., Yatabe, Japan) Kenkyu Hokuku-Sen'i Kobunshi Zairyo Kenkyusho 1981, (129), 13–16 (Japan), abstracted in Chemical Abstracts 95: 2205-45h, shows the reaction of poly (p-vinylphenol) and diazotized 3- or 4-substituted aniline to obtain polymers which produce complexes with copper. Such polymers would thus appear to be useful as metal chelating agents.

Copolymers of dialkyl muconates and polymerizable co-monomers are also known in the art. Thus, Bando et al., Journal of Polymer Science, Polymer Chemistry Edition, Vol. 15, 1917–1926, (1977), disclose copolymers of diethyl muconate with styrene, acrylonitrile or 2-vinylpyridine.

The prior art in U.S. Pat. No. 4,775,730 also discloses copolymers of acetoxystyrene and a polyunsaturated carboxylic ester.

However, none of the prior art disclosed above provides a suitable polymeric material which has unique solubility properties over a wide pH range in both aqueous and non-aqueous media.

DESCRIPTION OF THE INVENTION

In accordance with this invention, a new class of resin is provided which is an amphoteric copolymer derived from vinylpyridine and acetoxystyrene. This new polymer is prepared according to the following scheme:

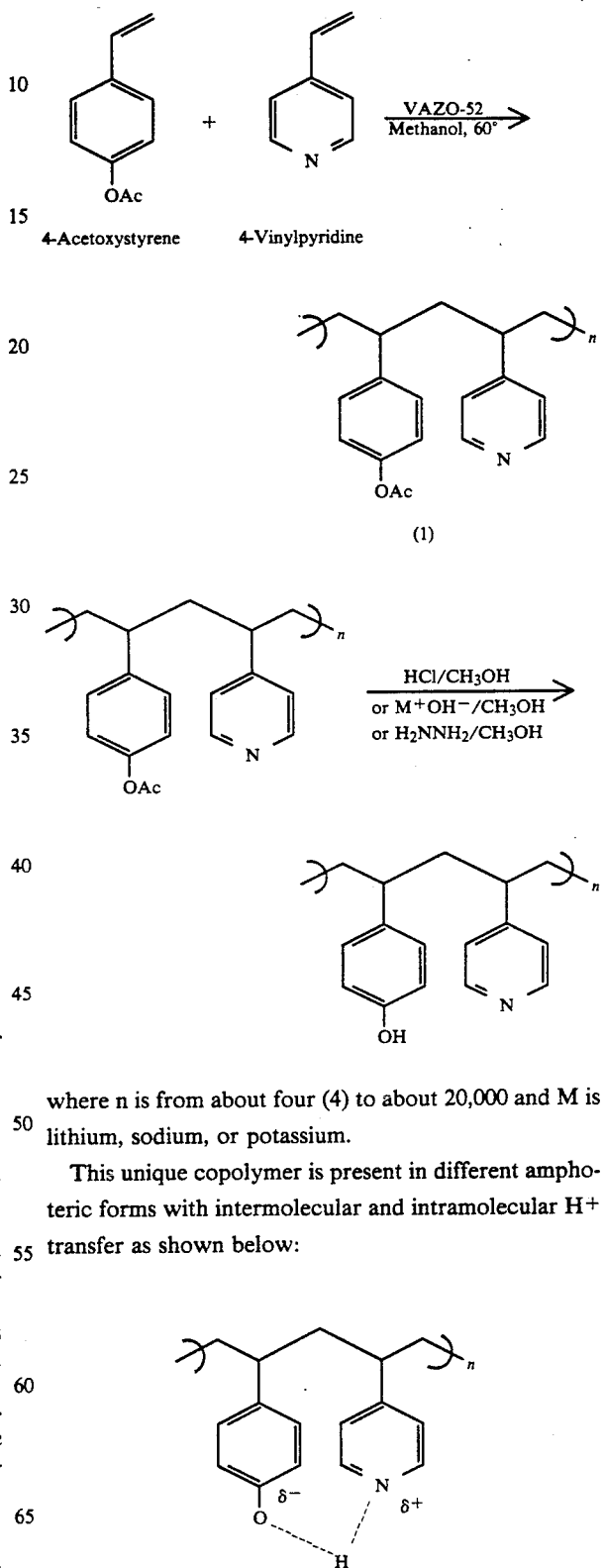

where n is from about four (4) to about 20,000 and M is lithium, sodium, or potassium.

This unique copolymer is present in different amphoteric forms with intermolecular and intramolecular H+ transfer as shown below:

-continued

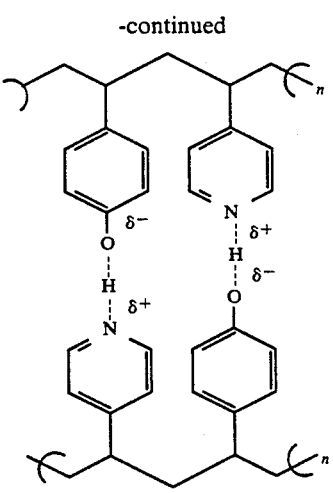

In formulae 3 and 4 above, n is four (4) to 20,000, and these are classified as the intramolecular and intramolecular equivalents thereof, (i.e., of formula 2).

It has been found that this copolymer which consists of repeating basic (e.g., pyridyl) and acidic (e.g., phenolic) monomer units imparts unique physicochemical properties to the polymeric backbone.

The copolymer of this invention may be suitably prepared by the free radical polymerization of vinylpyridine and acetoxystyrene, in solution, emulsion, or suspension, using well-known polymerization techniques. A free radical type of polymerization initiator or "catalyst" is generally employed which is preferably an azo compound such as 2,2'-azobis(2,4-dimethylpentanenitrile) (sold by duPont as "VAZO-52"), 2,2'-azobis(2-methylpropanenitrite) (sold by duPont as VAZO-64), 2,2'-azobis(methylbutyronitrile), (sold by duPont as "VAZO-67") and 1,1'-azobis(cyanocyclohexane) (sold by duPont as "VAZO-88"). Other free-radical polymerization initiators which may be used are peroxy compounds, e.g., benzoyl peroxide and potassium persulfate, and peresters and peroxyketals sold by Pennwalt under the trademark "Lupersols".

The polymerization is generally carried out at a temperature suitable to promote the reaction, preferably from about 50° C. to about 100° C. and more preferably from about 60° C. to about 80° C. During the polymerization, it also preferred to employ an organic solvent to facilitate ease of reaction. Such solvents include soluble alcohols, di- or tri-functional alcohols, ketones, cyclic ethers, and mixtures thereof. Especially preferred solvents are aliphated alcohols having about one (1) to about four (4) carbon atoms, such as methanol, ethanol, n-propanol, isopropanol, and 1,2-propane diol. Most preferred is methanol and ethanol.

The conversion of the copolymer (formula 1) to the formula 2 copolymer is carried out by acid or base catalyzed alcoholysis wherein the preferred alcohols are methanol or ethanol. The acid catalyzed methanolysis, in general, is more fully described in copending application Ser. No. 07/706,601 filed May 28, 1991, and which is incorporated herein by reference. However, when using HCl as the acid catalyst, it is desirable to utilize greater amounts than that disclosed in Ser. No. 07/706,601. When using the base catalyzed methanolysis process, the procedure set forth in U.S. Pat. No. 5,087,772 can be used; this patent is incorporated herein by reference.

The copolymer of the invention will generally contain about one (1) to about ninety-nine (99) weight percent of the designated vinylpyridine and about one (1) to about ninety-nine (99) weight percent of the p-acetoxystyrene monomer. However, a preferred copolymer is made from equal molar ratios (1:1) of vinylpyridine and acetoxystyrene.

The copolymer of this invention has various applications. Thus, the copolymer may be blended with any of various radiation polymerizable polyunsaturated compounds, e.g., polyol acrylates or methacrylates, and optionally a monounsaturated radiation polymerizable compound, e.g., ethoxyethyl acrylate to form radiation curable coating compositions. The copolymers can also be used in the preparation of negative acting photoresists, e.g., by dissolving the copolymer in an organic solvent such as a mixture of xylene and butyl acetate with a compound serving to cross-link the copolymer when exposed to suitable radiation, e.g., 2,6-bis(4-azidylbenzylidene)-4-methyl cyclohexanone (bis-azine). Such a composition may be coated onto a surface subjected to suitable UV radiation to cross-link the copolymer while in contact with an appropriate photomask and the surface developed by dissolving the uncrosslinked polymer in a solvent to obtain a pattern of exposed surface of fairly high resolution.

The amphoteric copolymer is also useful in a variety of environmental and industrial applications, e.g., variable-charge, ion-exchange membranes (as a function of pH) to perform demineralization, de-alkalization, and purification of waste water. It is also useful as a selective chelating agent for trace metals (Hg, Cd, Cu, and Ni) in water treatment. This amphoteric copolymer is useful as a viscosity modifier in displacing viscous oils from underground reservoirs, in sewage treatment, as soil conditioners, as flocculants, and in the recovery of minerals from aqueous suspensions, where a variety of solid-liquid separations are encountered. This polymer is also employed in shampoos and hair conditioners, as paper fortifiers, antistats, and pigment retention aids. It is also used as a standard for isoelectric focusing of proteins, gelatin substrates of photographic film, and, in some select cases, as controlled release of pharmaceuticals.

DESCRIPTION OF SPECIFIC EMBODIMENT

The following examples further illustrate the present invention:

EXAMPLE I

A 100 ml 3-necked round-bottomed flask equipped with a magnetic stirrer, nitrogen inlet, reflux condenser, and addition funnel was charged with 4-acetoxystyrene (4.86 g, 30 mmol), 4-vinylpyridine (3.15 g, 30 mmol) and methanol (16 ml). A solution of VAZO 52 (0.24 g, dissolved in 1 ml of methanol) was added to this stirred solution. The flask was evacuated and flushed with nitrogen three (3) times. The solution was then heated in an oil bath so that a very gentle reflux was maintained (bath temperature 60° C.). Three (3) additional portions of VAZO 52 (60 mg each) were also added to the solution at one (1) hour intervals. After refluxing for twenty (20) hours, complete disappearance of 4-acetoxystyrene was observed as determined by high pressure liquid chromatography (HPLC). The reaction mixture was cooled to 22° C. and concentrated HCl (3 ml) and methanol (40 ml) were added. The solution was refluxed for six (6) hours and then concentrated by atmospheric distillation to a volume of approximately twenty (20) ml. The solution was cooled to 22° C. and neutralized by addition of aqueous ammonium hydroxide (6N) to a pH of seven (7). The mixture was stirred at 22° C. for one (1) hour and filtered. The product cake was washed with ten (10) ml water and dried at 50° C. under house vacuum overnight, affording 5.4 g (80% yield) of co-polymer product.

The synthesis of the copolymer (2) (and 3, 4, and 5 above) is presented in Scheme 1 above. 4-Acetoxystyrene and 4-vinylpyridine (1:1 molar ratio) were copolymerized in methanol under radical conditions using VAZO 52 (2,4-dimethylpentanenitrile) as a radical initiator to produce the corresponding copolymer (1) in solution. Formula 1 was isolated (via precipitation from water) and independently characterized by $^{13}C$ and $^1H$ NMR. Hydrolysis of the acetoxy group in the copolymer (1) was accomplished by transesterification in methanol/HCl—$H_2O$ followed by azeotropic removal of the resulting methyl acetate. The copolymer (2) was precipitated by adding the resulting methanolic solution into excess of water. The overall isolated yield of the copolymer was 80% over the two (2) steps. Formula 2 was characterized by $^1H$ NMR, $^{13}C$ NMR, IR, GPC, DSC and TGA. $^{13}C$ NMR and IR analysis of 2 indicated complete hydrolysis of the acetoxy group. The composition of the styrene and pyridine units is approximately 1:1 as evidenced by $^{13}C$ NMR. The presence of the active hydrogen was confirmed by $D_2O$-exchange in the $^1H$-NMR as sown by scheme 2. The $^{13}C$ chemical shifts of $C\alpha$ and $C\beta$ of the pyridyl unit in the copolymer (1) observed in $D_6$-DMSO were $\delta C=149.5$ for $C\alpha$ and 122.95 for $C\beta$. Protonation of the pyridine unit (by addition of HCl to the $D_6$-DMSO solution) resulted in a downfield shift of $C\alpha$ ($\delta C=141.0$) and upfield shift of $C\beta$ ($\delta C=126.5$) in Formula 1a. Comparison of the corresponding $^{13}C$ chemical shifts of the copolymer (2) in $D_6$-DMSO showed $\delta C=148.5$ for $C\alpha$ and $\delta C=123.2$ for $C\beta$ thereby indicating that 2 is probably present as 2a (where the pyridyl unit remains unprotonated) rather than as 2b, at least under the NMR condition in $D_6$-DMSO solution (Scheme 2). TGA and DSC analysis of the copolymer indicated good thermal stability up to 300° C. DSC also indicated the absence of any undesirable blockiness in the polymeric backbone. The GPC analysis indicated Mn=1572 and Mw=2813. Polydispersity of 1.78 indicated narrow MW-range which is preferable for obtaining good mechanical properties. The fact that the copolymer was not a mechanical mixture of two homopolymeric units was also indicated by narrow dispersity range. The wet polymer was soluble in a wide variety of organic solvents, e.g. acetone, methanol, THF, and DMSO. Due to the amphoteric nature of the polymer (phenolpyridine acid-base pair), it was also soluble in $H_2O$ under both acidic (pH=2) and basic (pH=10) conditions.

Scheme 2

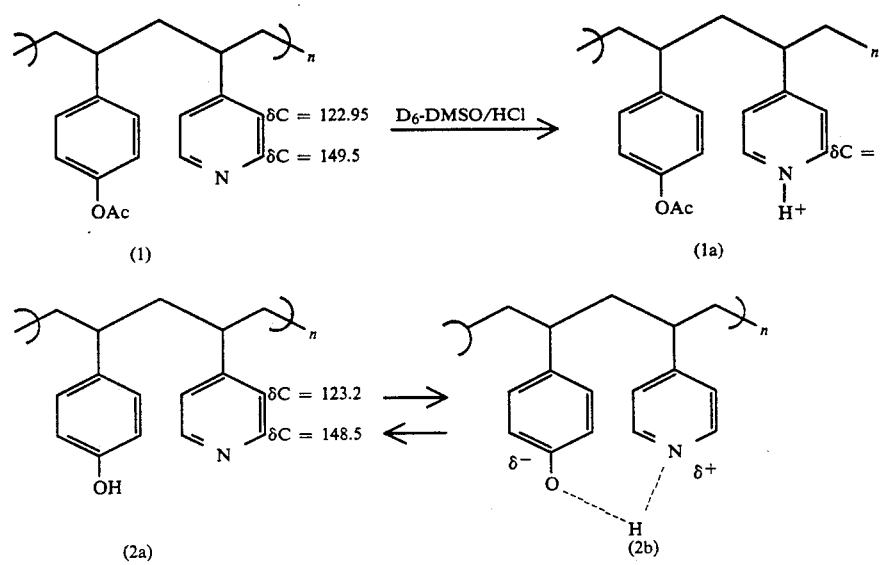

EXAMPLE II

In order to demonstrate the chelating utility of this copolymer, ten (10) grams of the copolymer was produced according to the process described in Example I. A 1% solution of copper sulfate (1000 ppm $CuSO_4$) was combined with 100 ml of water to produce a light blue solution containing copper ions. The ten (10) grams of copolymer product was added, with stirring, to this solution. The resultant material was filtered to remove the copolymer-copper complex and the filtrate, which was clear and colorless, and was tested for copper sulfate content. The filtrate analyzed less than ten (10) ppm $CuSO_4$.

What is claimed is:

1. An amphoteric polymer produced by the process which comprises reacting vinylpyridine with acetoxystyrene and then subjecting the resultant polymer to hydrolysis, said amphoteric polymer further characterized by containing from about 1 to about 99 weight percent of the vinylpyridine and from about 1 to about 99 weight percent of the acetoxystyrene.

* * * * *